US012748816B2

(12) United States Patent
Zheng et al.

(10) Patent No.: US 12,748,816 B2
(45) Date of Patent: Sep. 29, 2026

(54) WEB-BASED AUTOMATED HTML ELEMENT LOCATION PROVIDER

(71) Applicant: SAP SE, Walldorf (DE)

(72) Inventors: Suren Zheng, Shanghai (CN); Yawen Zhang, Shanghai (CN); Jiagang Cao, Shanghai (CN); Ronghua Bao, Shanghai (CN); Ping Ni, Shanghai (CN)

(73) Assignee: SAP SE, Walldorf (DE)

( * ) Notice: Subject to any disclaimer, the term of this patent is extended or adjusted under 35 U.S.C. 154(b) by 160 days.

(21) Appl. No.: 18/362,279

(22) Filed: Jul. 31, 2023

(65) Prior Publication Data

US 2025/0045343 A1 Feb. 6, 2025

(51) Int. Cl.
*G06F 40/143* (2020.01)
*G06F 16/957* (2019.01)
*G06F 16/958* (2019.01)

(52) U.S. Cl.
CPC ........ *G06F 16/9577* (2019.01); *G06F 16/986* (2019.01); *G06F 40/143* (2020.01)

(58) Field of Classification Search
None
See application file for complete search history.

(56) References Cited

U.S. PATENT DOCUMENTS 7,934,201 B2 * 4/2011 Sweis ................ G06F 11/3684 717/124
11,250,097 B1 * 2/2022 Clarke ................ G06F 16/9535
2010/0131869 A1 * 5/2010 Adachi ..................... G06F 8/36 715/769
2010/0146383 A1 * 6/2010 Kim .................... G06F 16/9577 715/238
2011/0166898 A1 * 7/2011 Zarrow .................. G06Q 10/02 707/769
2012/0246552 A1 * 9/2012 Liu ....................... G06F 16/955 715/234
2015/0186249 A1 * 7/2015 Miller ..................... H04L 67/01 717/127
2019/0155870 A1 * 5/2019 Prakash ................ G06F 40/103
2020/0356466 A1 * 11/2020 Thangam ................ G06F 40/12
2021/0049234 A1 * 2/2021 Kumar .................. G06F 40/117
2021/0182470 A1 * 6/2021 Gupta ................... G06F 40/143
2021/0319106 A1 * 10/2021 Chatterjee ................. G06F 8/75
2022/0374336 A1 * 11/2022 Brown ................ G06F 11/3684
2023/0195825 A1 * 6/2023 Rao ....................... G06F 16/986 715/235
2024/0012555 A1 * 1/2024 Van Opstal ......... G06F 3/04855

* cited by examiner

*Primary Examiner* — Tuyetlien T Tran
(74) *Attorney, Agent, or Firm* — Buckley, Maschoff & Talwalkar LLC

(57) ABSTRACT

Briefly, embodiments of a system, method, and article for receiving a user selection of a HyperText Markup Language (HTML) element on a web page. A source representation of objects which comprise a structure and content of the web page may be automatically acquired. The source representation may be automatically processed to determine an ordered list of candidate locations for the HTML element. An output locator may be generated and displayed. The output locator may present the ordered list of location candidates for the HTML element.

16 Claims, 11 Drawing Sheets

WEB-BASED AUTOMATED HTML ELEMENT LOCATION PROVIDER

BACKGROUND

In the era of cloud business, fostering innovation and supporting customers with their digital transformations is a key to success. The use of a cloud-based platform may change the way customers work as well as the way a provider of the cloud-based platform services the customers. For example, it is of critical importance for a provider of cloud-based services to maintain or improve a high level of customer satisfaction and provide the customers with high quality products with better user experiences, in order to convince the customers to continuously renew the cloud-based services.

Web-based automation is a way to simulate certain web-based actions such as button clicks or the input of a value into a web page, spreadsheet, or electronic form, for example. Web-based automation is becoming more important and may be used in various areas such as web-based end-to-end scenarios testing, scenario configuration, and auto-provisioning for cloud service, to name just a few examples. Web-based automation may help customers to reduce certain types of repetitive, complex, and time-consuming manual efforts, increase efficiency, and provide more scalability to the customer's cloud-based business.

However, a challenge in achieving automation is how to locate a particular HyperText Markup Language (HTML) element for a web page for which an automation process is to be applied. For example, in order to apply an automation process to the HTML element, the location or address for the HTML element must be determined. For a web page with many different HTML elements, it may be difficult to accurately identify the correct location for an HTML element for which automation is to be applied. For example, a dynamic web page may include HTML elements and other items which are regularly updated and the updates may cause addresses for HTML elements to frequently change. For such a dynamic web page, identifying the correct locations or addresses of HTML elements may be of vital importance.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
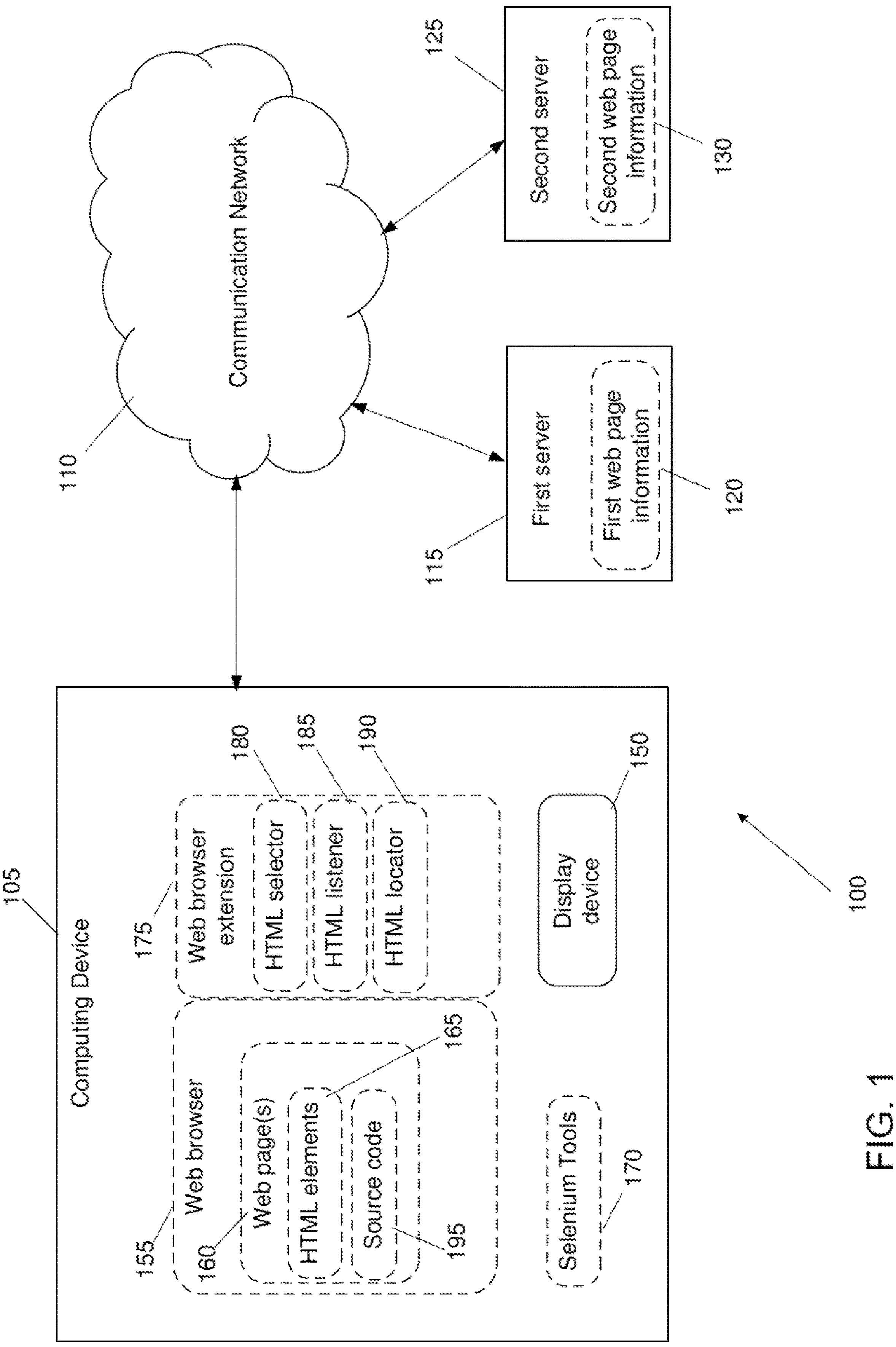
FIG. 1 illustrates an embodiment of a system in which an HTML locator may determine a location of one or more HTML elements of a web page.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

In order to achieve web-based automation, such as for testing various scenarios, configuring the scenarios, and/or automatically provisioning certain cloud-based services, an HTML element to which an automation process is to be applied may need to be correctly located on a particular web page. For example, a web page may present an electronic form and may have potentially hundreds of different HTML elements capable of being automated, but the correct location of a particular HTML element desired to be automated may need to be determined before that HTML element may be automated.

One way of determining a location or address of an HTML element is for a user to manually select a particular function key within a web browser. For example, the Google Chrome™ browser has a function for determining a location or address of an HTML element. Specifically, a user may depress the F12 key on a keyboard or may otherwise select an HTML location determination function from a menu for the Chrome™ browser. Upon selecting an HTML element to be located, a listing of potential locations or addresses for the HTML element may be determined and presented. However, the list of potential locations or addresses may not be accurate nor human-readable if determined via the F12 keyboard functionality. As discussed below, an XPath (Extensible Markup Language (XML) Path Language) generated through the use of the F12 keyboard functionality contains relatively too many parent nodes, information which is both easy to be changed during user browsing the website and may frequently be updated by a website developer. As a result of such frequent changes, the XPath for an HTML element may only be correct at the exact moment at which it is acquired, but may subsequently become invalid the next time a user browses to the website. Moreover, an XPath generated via the F12 keyboard functionality does not contain any element attributes other than an identifier (id) attribute. Because only an id attribute is included, it may be more difficult for a user to identify how to map HTML elements to the locators later during creation of an automation script, for example. Moreover, such a process may require a significant amount of manual input from a user, particularly for a web page on which a relatively large number of HTML elements are to be located. Examples of HTML elements capable of being automated include a volume button for a video application, a check box, an input box, a delete button, or an enter button, to name just a few examples among many. An HTML element may also comprise a hyperlink to another web page or document.

In accordance with one or more embodiments, a system and process are provided to produce an HTML locator which provides location candidates for an HTML element in an automated way. The location candidates may comprise XPath or Cascading Style Sheets (CSS) selector representations. XPath is an expression language designed to support the query or transformation of HTML or Extensible Markup Language (XML) documents. The XPath language is based on a tree representation of an HTML or an XML document, and provides an ability to navigate around the tree, selecting nodes by a variety of criteria. For example, a location of an HTML element located at a particular node may be represented by an XPath for the node at which the HTML element is located.

XPath uses path expressions to select nodes in an HTML or an XML document. A node may be selected by following a path or steps. Examples of comment path expression in XPath include an expression, "nodename," where this expression is used to select all nodes with the name "nodename". Another expression, "/" may be used to select one or more nodes from the root node. Expression, "//" may be used to select nodes in a web page or document from the current node which match a selection no matter where they are. Expression, " . . . " may be used to select the parent node of the current node. Expression, "@" may be used to select attributes.

Selenium™ is an open source umbrella project for a range of tools and libraries aimed at supporting browser automation. Selenium™ may comprise an automation library, for example. Selenium™ may be used to perform some types of automation on a web page within a web browser, such as the Chrome™ browser, but Selenium™ still requires a programmer to provide the location of each HTML element desired to be automated. For example, in order to perform automation, the correct locations or addresses of the HTML elements on the web page must be determined and provided to Selenium™ or some other automation platform.

Selenium™ provides an automated testing framework used to validate web applications across different browsers and platforms. Multiple programming languages such as Java, C#, or Python, for example, may be utilized to create Selenium™ Test Scripts. Selenium™ software is not just a single tool but a suite of software, each piece catering to different Selenium™ testing needs of an organization. However, in order to create Selenium™ scripts to automate one or more HTML elements of a web page, a programmer or test engineer must know the actual address of an HTML element to be automated.

An HTML locator may be utilized to determine a location of a particular HTML element. An "HTML element," as used herein refers to a component of an HTML web page or document which tells a web browser how to structure and interpret a part of the HTML web page or document. Examples of HTML elements include a hyperlink to another web page or electronic document, a brightness control item, a volume or mute control item, a cell or portion of a document in which a value may be entered and/or displayed, or any other item of a web page or electronic document, for example. An HTML element may be set off from other text in a document by "tags." "Tags" may comprise element name surrounded by "<" and ">", for example. The name of an element inside a tag is case-insensitive such that the name of the element may be written in uppercase, lowercase, or a mixture of both. For example, a <title> tag can be written as <Title>, <TITLE>, or in any other way. An "HTML locator," as used herein, refers to an application or other item capable of determining a location or address of at least one HTML element. For example, an HTML locator may receive a user input indicating a particular HTML element for which a location is desired, and the HTML locator may determine one or more location candidates for the HTML element. For example, the HTML locator may not be capable of determining the location of the HTML element with 100% accuracy so the HTML locator may instead determine a list of multiple different likely locations or addresses for the HTML element and may present an ordered list of the determined locations or addresses.

An HTML locator may enable a web page tester to select an HTML element. Different types of HTML locators may be utilized to determine or identify locations of HTML elements on a web page. One type of HTML locator for a web page is XPath and another type of HTML locator is a CSS selector. XPath provides a way to describe an HTML element via its own attributes and its HTML Document Object Model (DOM) tree structure. HTML DOM is an Object Model for HTML. HTML DOM may define HTML elements as objects, properties for HTML elements, methods for HTML elements, and events for HTML elements, for example.

HTML DOM is a cross-platform and language-independent interface that treats an HTML document as a tree structure wherein each node is an object representing a part of the document. The DOM represents a document with a logical tree. Each branch of the tree ends in a node, and each node contains objects. DOM methods allow programmatic access to the tree. DOM methods enable a programmer to change the structure, style or content of a web page or electronic document.

A CSS selector, on the other hand, may be focused on the characteristics of the HTML elements themselves. A CSS selector is a useful method to determine the location of an HTML element when the structure of the HTML DOM tree for the web page is relatively complex. CSS selectors define the pattern to select elements to which a set of CSS rules are then applied. CSS selectors may be grouped into various categories based on the type of elements they can select.

One way of generating an XPath is to locate the HTML element in a DOM tree by using an absolute XPath. Here, an HTML element's parent node must be continuously noted until a root HTML node is reached. Every HTML element has a unique and absolute path, an XPath. However, an absolute path may not be stable. For example, whenever there is something changed in the HTML DOM tree for a web page, it may make the original absolute path invalid. Nowadays, dynamic web pages are quite common and the DOM tree for a web page may be changed frequently.

Another way to generate an XPath is to use a relative XPath. With a relative XPath, necessary information from a DOM tree may be determined, such as DOM tree structure, element attributes, and inner text elements. DOM tree information may subsequently be combined into an accurate and stable XPath. A stable XPath is one which will always work regardless of how often a web page is refreshed. A relative XPath is just as flexible as it may describe how one may go from home to an office.

For web pages which may not be accurately located by absolute or relative XPaths, a combination of XPath and a CSS selector may be utilized to determine one or more location candidates for an address of an HTML element.

CSS selector is a locating language to describe elements being located. The CSS Selector combines an element selector and a selector value that can identify particular elements on a web page. Like XPath in Selenium™, a CSS selector may locate web elements without certain information such as ID, class, or Name. A "Type" CSS selector may be used to select an HTML element based on its HTML Tag. A "Class" CSS selector may be used to select an HTML element based on its class name. An "Identifier (ID)" CSS selector may be used to select an HTML element based on its ID. An "Attribute" CSS selector may be used to select an HTML element based on its attributes.

FIG. 1 illustrates an embodiment of a system 100 in which an HTML locator may determine a location of one or more HTML elements of a web page. System 100 may include a computing device 105, such as a personal computer of a user, which is in communication with at least one of a first server 115 and a second server 125 via a communication network 110, such as the Internet. First server 115 may comprise a web page server in which first web page information 120 or data for one or more first web pages is stored. Second server 125 may comprise a web page server in which second web page information 130 or data for one or more second web pages is stored. Although only two servers are shown in FIG. 1, it should be appreciated that communication device 105 may be in communication with additional servers, for example.

Computing device 105 may include a processor, a memory device, a receiver, a transmitter, an Input/Output (I/O) device, and/or a display device 150, for example. The processor may execute one or more operations, such as by executing program instructions stored in a memory device, for example. The transmitter may transmit one or more electronic signals via communication network 110 to first server 115 and/or second server 125, such as to request first web page information 120 and/or second web page information 130 relating to the one or more web pages. First server 115, for example, may provide the requested web page information 120 relating to the one or more web pages to computing device 105 via communication network 110. For example, the web page information 120 relating to the one or more web pages may be received by a receiver of computing device 105. An I/O device of computing device 105 may receive one or more user inputs, such as received via a keyboard, microphone, or some other electronic device capable of receiving an input or instruction from a user. The I/O device may also include one or more speakers or other electronic device(s) capable of presenting information to a user. Display device 150 may comprise a monitor or other electronic device(s) capable of displaying information to a user.

A processor of the computing device 105 may execute a web browser application in order to present a web browser 155 to a user, such as via display device 150. Web browser 155 may present or render one or more web pages 160. For example, the one or more web pages 160 may be displayed which correspond to first web page information 120 received from first server 115 and/or second web page information 130 received from second server 125. Each of the displayed or rendered web pages 160 may include various HTML elements 165 and source code 195 for the displayed or rendered web pages 160. The HTML elements 165 may comprise features or aspects of a web page 160 which are capable of being automated, such as via Selenium™. For example, Selenium™ Tools 170 may be installed within web browser 155 or within an extension to the web browser 155, for example. Selenium™ Tools 170 may comprise drivers which are capable of automating one or more aspects of the HTML elements 165, such as to test one or more features of a web page or an environment thereof. However, as discussed above, in order to perform automation with Selenium™ Tools 170, a location of an HTML element desired to be automated must be determined. For example, a user may select a particular HTML element 165 to be located, such as via an I/O device of the computing device 105. For example, a user may drag a cursor over a displayed HTML element 165, such as a displayed hyperlink or cell of an electronic form of a web page, and may select the HTML element. A location of the selected HTML element may subsequently be determined. For example, a web browser extension may be installed within the web browser 155 or as an attachment to the web browser 155. Web browser extension 175 may include or may otherwise generate an HTML selector 180, an HTML listener 185, and an HTML locator 190, for example. HTML selector 180 may be utilized by a user to select a particular HTML element to be located. HTML listener 185 may, for example, monitor where a user is moving a cursor or selector over a displayed web page and, if the curser is hovered over a particular HTML element, the HTML listener 185 may communicate the identity or name of the HTML element hovered over to the HTML locator 190. The HTML locator 190 may, in turn, determine or estimate one or more candidate locations of the selected HTML element. For example, the HTML locator 190 may generate a display window to display an ordered list of candidate locations for the HTML element. After the HTML locator 190 displays the ordered list of candidate locations for the HTML element, a user may copy one of the candidate locations for the HTML element and may paste the candidate location into a selection window provided by Selenium™ Tools 170, for example. In accordance with an embodiment, Selenium™ tools 170 may provide automation features to the HTML element in response to the user providing a likely location of the HTML element.

Figure 2:
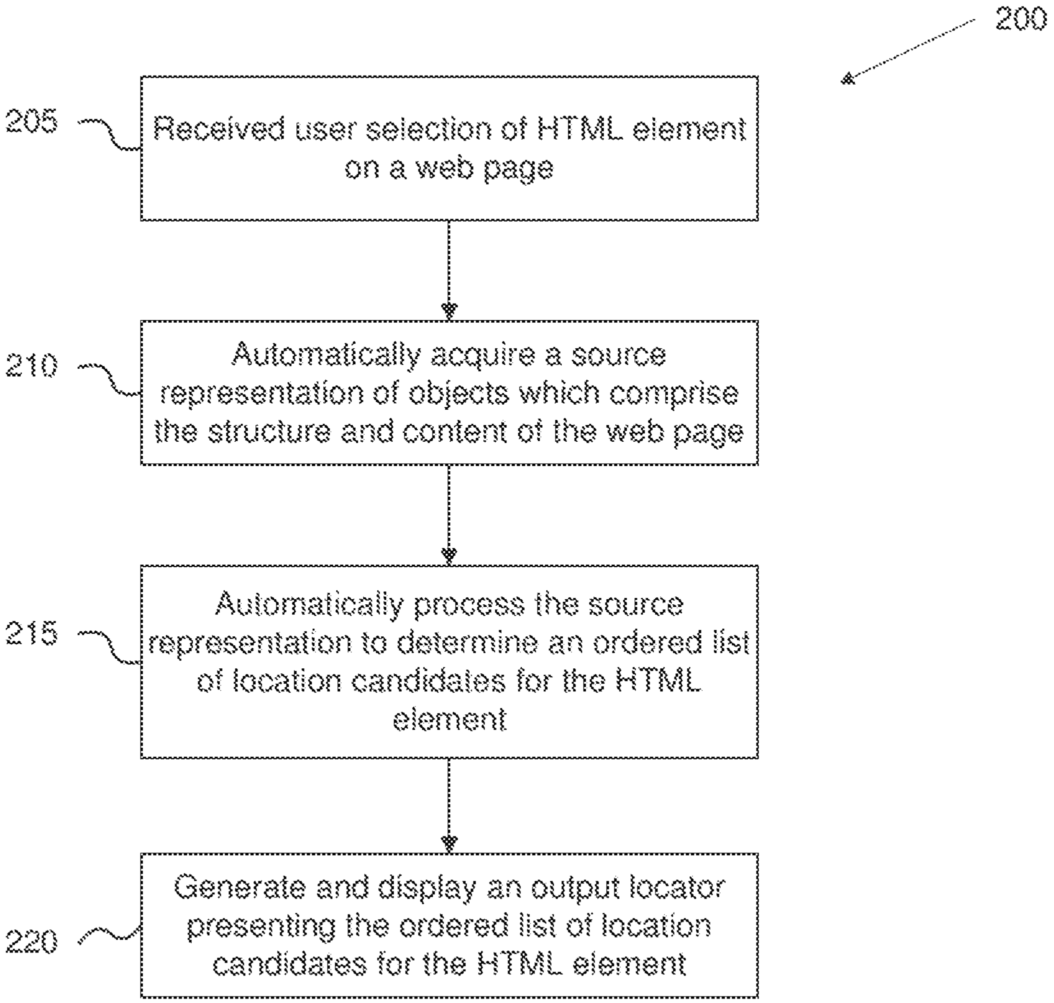
FIG. 2 illustrates an embodiment of a flowchart of a process for automatically determining a location for a selected HTML element.

FIG. 2 illustrates an embodiment of a flowchart 200 of a process for automatically determining a location for a selected HTML element. Embodiments in accordance with claimed subject matter may include all of, less than, or more than blocks 205 through 220. Also, the order of blocks 205 through 220 is merely an example order. For example, a method in accordance with embodiment 200 may be performed by a computing device having one or more processors.

At operation 205, a user selection may be received of an HTML element on a web page. As discussed above, with respect to FIG. 1, a web page having a plurality of HTML elements may be displayed via a web browser. A user may utilize a mouse or some other type of I/O device to select an HTML element whose location is desired to be determined. At operation 210, a source representation of objects which comprise a structure and content of the web page may automatically be acquired. For example, the source representation may comprise source code for a web page being displayed in a web browser. In accordance with an implementation, information or data corresponding to a web page may be received from a server, such as a web page server, and the web page may be displayed, such as on a computer monitor via a web browser. The data corresponding to the web page received from the server may include the source code or element code for the web page. At operation 215, the source representation may be automatically processed to determine an ordered list of location candidates for the HTML element. For example, it may not be possible to determine the location of an HTML element with exact precision. However, two or more candidate locations of the HTML element may be identified or otherwise determined. The two or more candidate locations of the HTML element may be ranked based on how accurate the estimates of the location are likely to be. At operation 220, an output locator may be generated and displayed, such as via a browser window, to present the ordered list of location candidates for the HTML element.

Figure 3A:
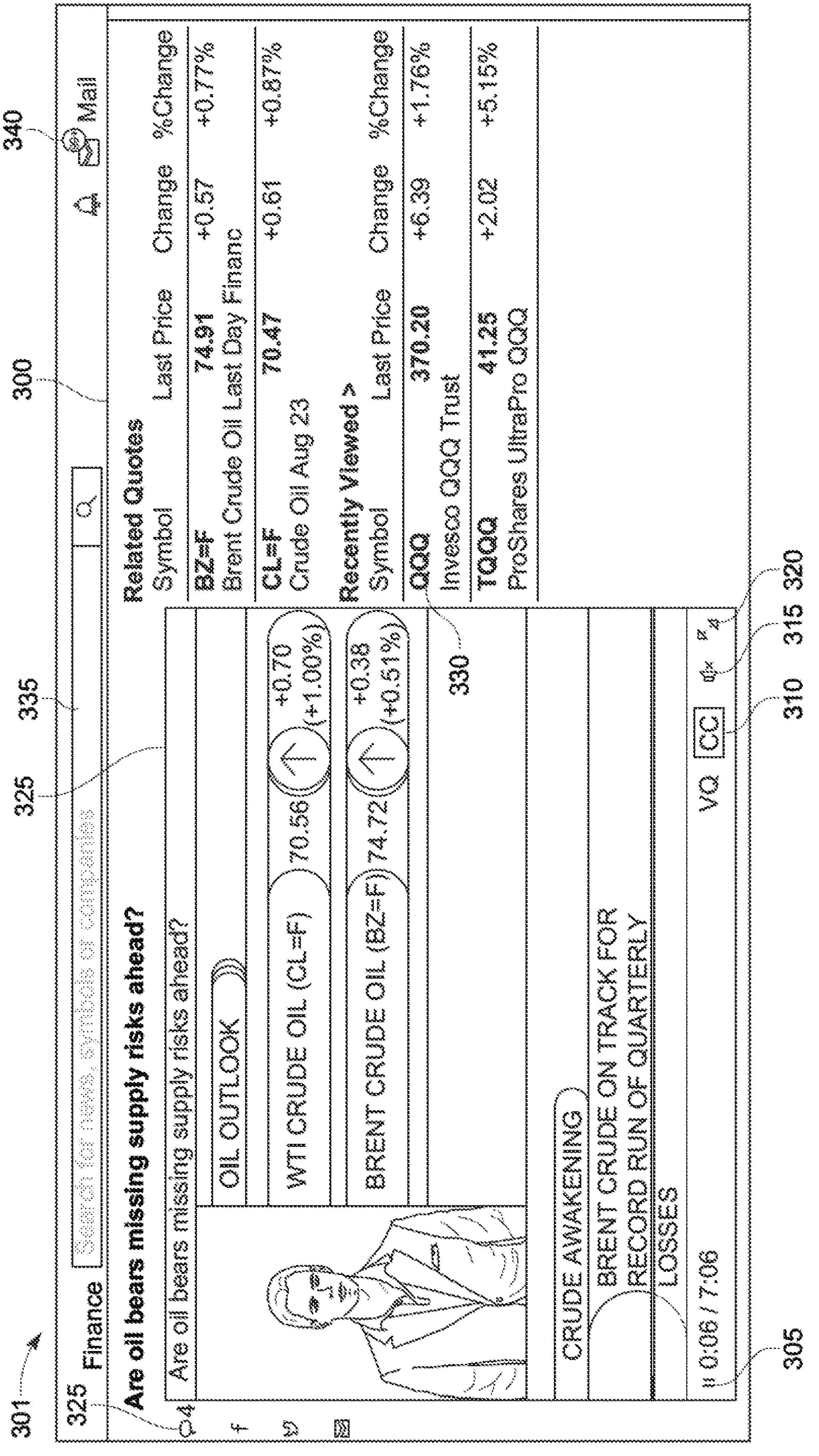
FIGS. 3A-3D illustrate screenshots of a web page having selectable HTML elements and an HTML locator according to an embodiment.

FIGS. 3A-3D illustrate screenshots of a web page having selectable HTML elements and an HTML locator according to an embodiment. FIG. 3A illustrates a first screenshot 301 of a web page 300 on which a news article is displayed. The web page 300 may include various HTML elements such as a pause button HTML element 305, a closed-caption button HTML element 310, a volume button HTML element 315, and an expansion button HTML element 320 for an embedded video content window. The web page 300 may additional HTML elements such as a comment button HTML element 325, a hyperlink HTML element 330 to a stock quotation for an ETF with symbol QQQ, a search bar HTML element 335, an electronic mail hyperlink HTML element 340, as well as numerous other HTML elements. Web page 300 may be tested by a programmer to view how the web page will look and/or operate in various different scenarios. During such a testing process, different HTML elements may be automated. As discussed above, the automation may be implemented via application of Selenium™ tools, if the locations of each HTML element to be automated is first determined.

Figure 3B:
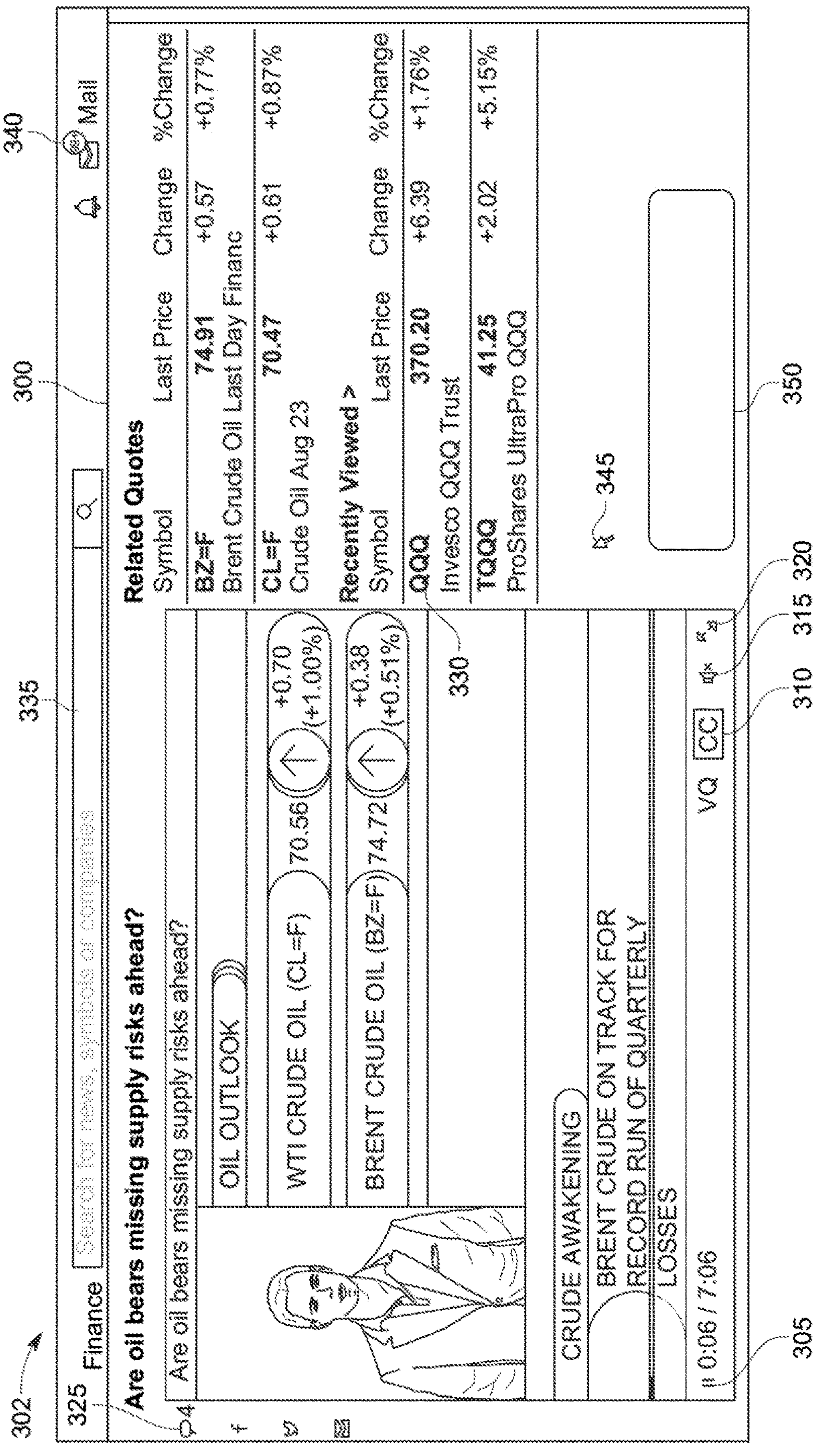

FIG. 3B illustrates a second screenshot 302 of a web page 300 on which a news article is displayed. Second screenshot 302 shows the same HTML elements as shown in first screenshot 301 of web page 300, but with the addition of a user selector 345 and an HTML location display window 350. In this example embodiment, user selector 345 comprises an arrow which a user may move across web page 300 such as via movement of an electronic mouse, touch keypad, or any other user input device. Moreover, although user selector 345 is illustrated as comprising an arrow, it should be appreciated that in some embodiments, a cursor, "+" sign, or any other icon capable of illustrating a user selection element may be utilized as user selector 345. It should be additionally noted that in some implementations, a user may be enabled to select an HTML element without using a user selector 345 capable of being dragged across web page 300. Instead, for example, a user may be enabled to depress a function key and manually select a particular HTML element for which a location is to be determined. HTML location display window 350 may comprise a box in which one or more locations of an HTML element may be displayed after a user has selected a particular HTML element for which a corresponding location is to be determined. In the example shown in screenshot 302, the HTML location display window 350 is blank because the user has not yet selected an HTML element via the user selector 345. A user may, for example, select an HTML element by hovering the user selector 345 over an HTML element.

Figure 3C:
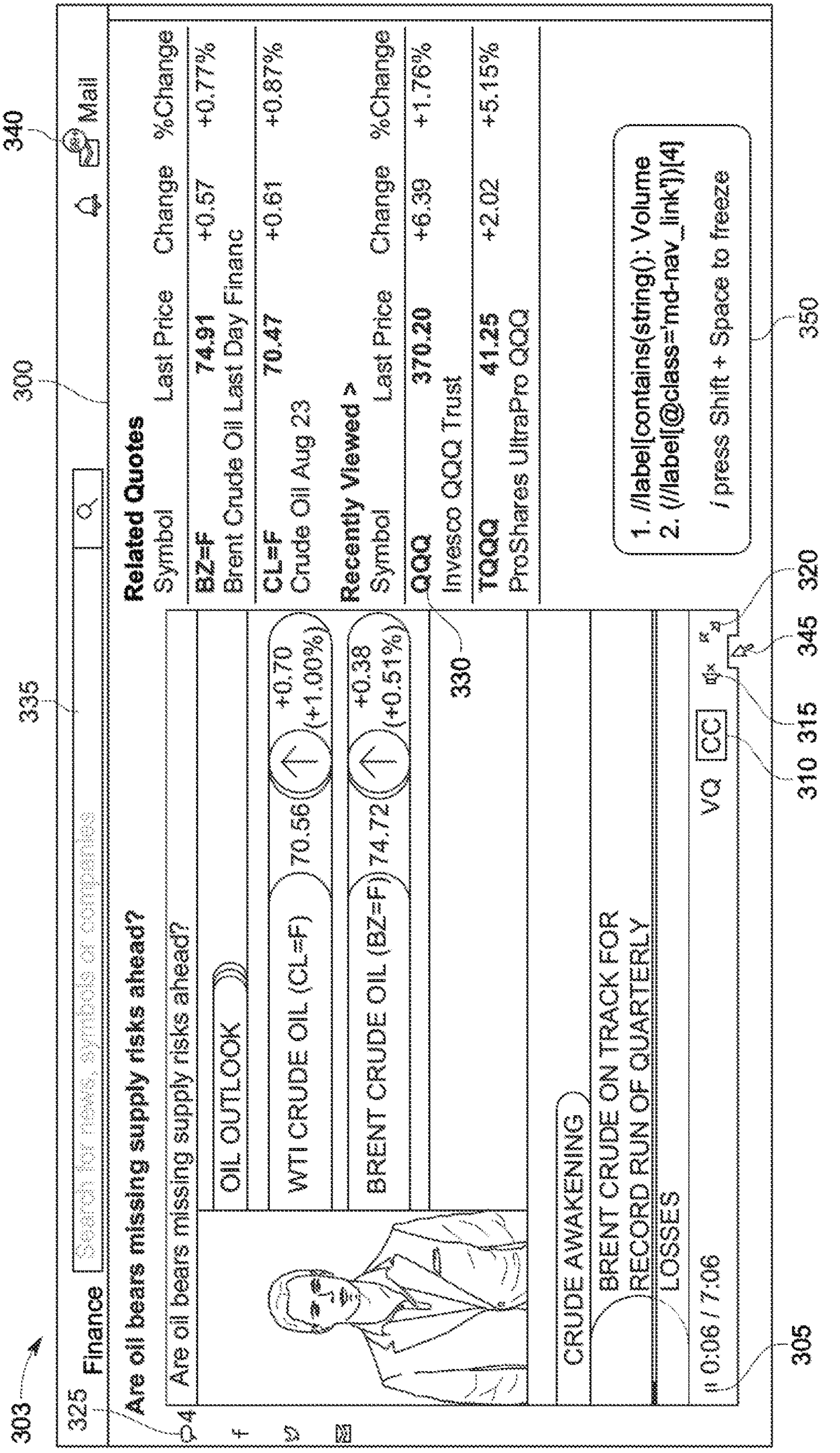

FIG. 3C illustrates a third screenshot 303 of a web page 300 on which a news article is displayed. Third screenshot 303 shows the same HTML elements as shown in second screenshot 302 of web page 300, but the user selector 345 has been moved to select volume button HTML element 315. For example, the user selector 345 has been moved so that it hovers over volume button 315 in order to select the volume button HTML element 315. A list of potential locations for the volume button HTML element 315 are shown in HTML location display window 350. In this example, the first suggested location is "//label [contains (string( ), 'Volume')]" and the second suggested location is "(//label [@class='md-nav_link'])[4]". A user may copy one of the suggested locations for subsequent pasting into a Selenium™ tool in order to provide automation for the volume button HTML element 315. The HTML location display window 350 also indicates that a user may "press Shift+Space to freeze" the results displayed within the HTML location display window 350, for example, to give the user a chance to copy one of the suggested location candidates.

Figure 3D:
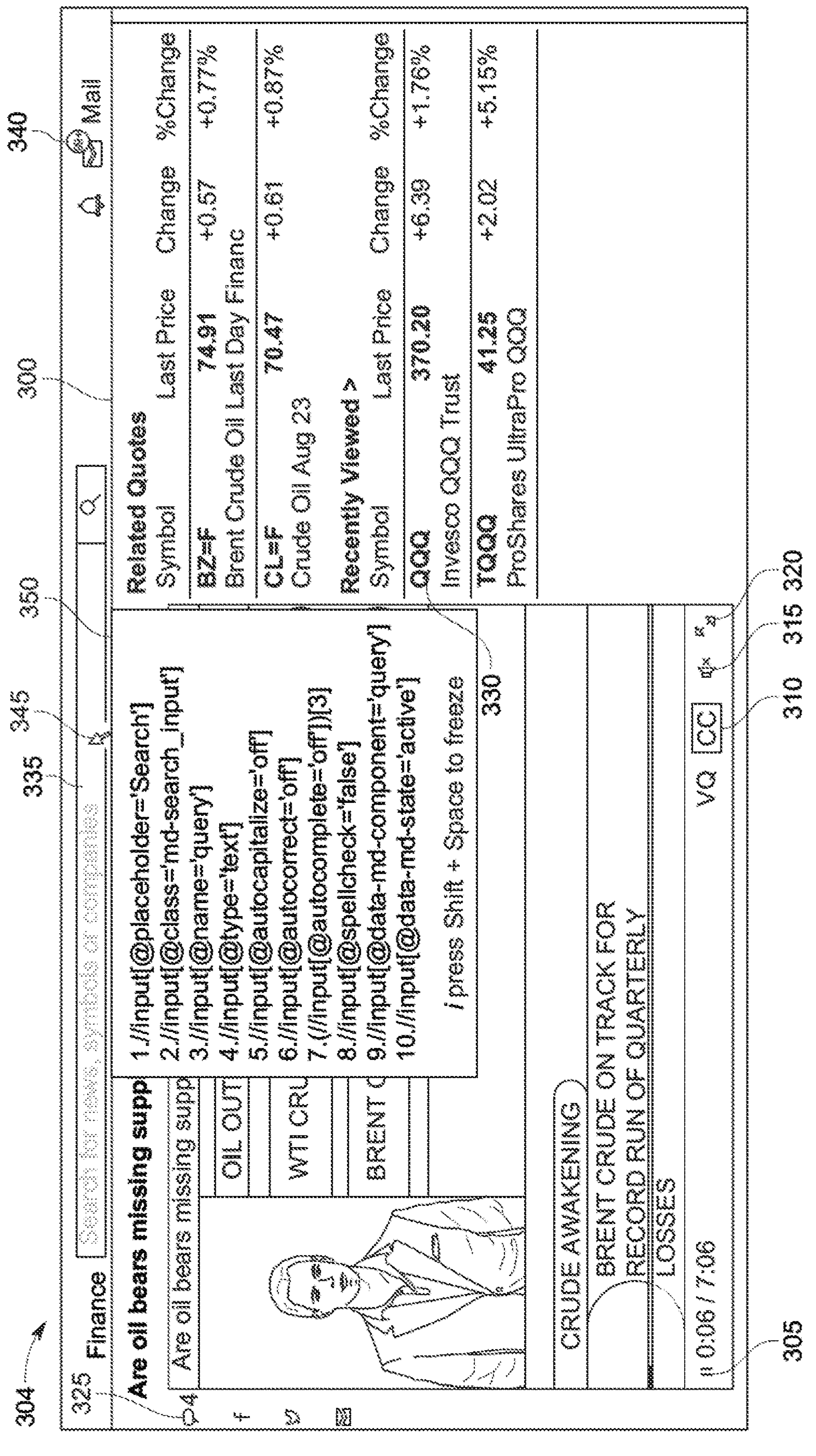

FIG. 3D illustrates a fourth screenshot 304 of a web page 300 on which a news article is displayed. Fourth screenshot 304 shows the same HTML elements as shown in first, second, and third screenshots 301, 302, and 303, respectively, of web page 300, but the user selector 345 has been moved to select search bar HTML element 335. A list of potential locations for the search bar HTML element 335 are shown in HTML location display window 350. In this example, the following location suggestions are displayed in a ranked order:

| | |
|---|---|
| 1. | //input[@placeholder='Search'] |
| 2. | //input[@class='md-search__input'] |
| 3. | //input[@name='query'] |
| 4. | //input[@type='text'] |
| 5. | //input[@autocapitilize='off'] |
| 6. | //input[@autocorrect='off'] |
| 7. | //input[@autocmoplete='Off'])[3] |
| 8. | //input[@spellcheck='false'] |
| 9. | //input[@data-md-component='query'] |
| 10. | //input[@data-md-state='active'] |

A user may copy one of the suggested locations for pasting into a Selenium™ tool in order to provide automation for the search bar HTML element 335.

Embodiments are described above which implement an algorithm or process for locating an HTML element into a browser extension. In some other implementations, a programmer may implement the algorithm or process within an application program, instead of within a browser extension, in order to implement an HTML selector.

If multiple HTML element candidate locations are determined for a particular HTML element, the different location candidates may be determined in different ways. For example, the most likely location candidate which is listed first and given the highest priority may be determined based on the considerations of different attributes associated with a selected HTML element.

Figure 4:
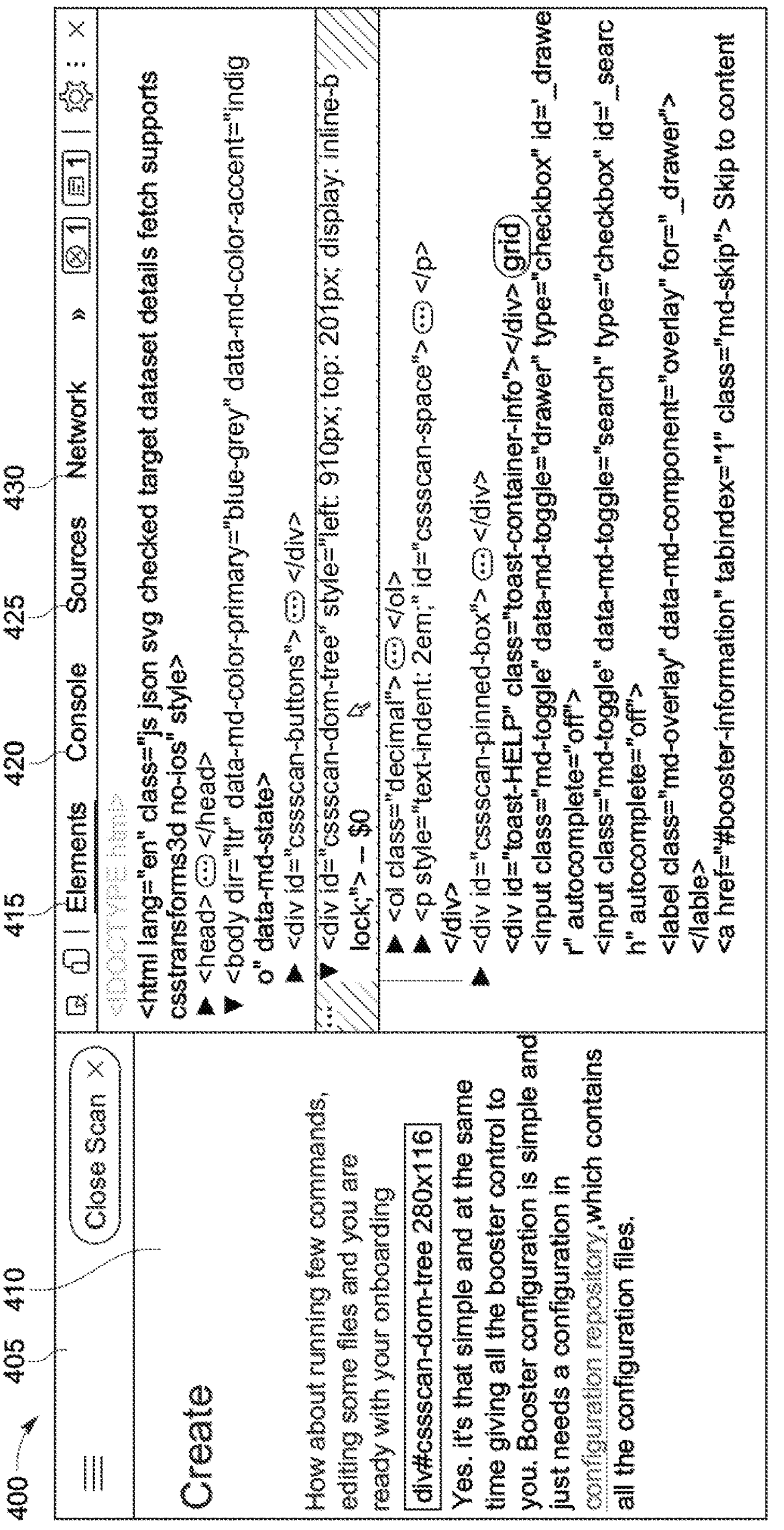
FIG. 4 illustrates a screenshot of a web page according to an embodiment.

FIG. 4 illustrates a screenshot 400 of a web page 405 according to an embodiment. Web page 405 includes text or information presented thereon in a main portion 410 of the web page. Web page 405 may also include various selectable tabs which may be used to display certain information about the content of the web page 405 which may normally be hidden from a user's view. For example, web page 405 may include an Elements tab 415, a Console tab 420, a Sources tab 425, and a Network tab 430. Web page 405 may include additional or different tabs in accordance with some implementations. If a user selects Elements tab 415, information about various HTML elements on the web page 405 may be displayed or otherwise presented to the user. If the user selects Console tab 420, a log of information associated with a web application, such as network requests and errors, may be displayed or otherwise presented. If the user selects Sources tab 425, the user may be enabled to set breakpoints and evaluate expressions in Javascript™, such as whether Javascript™ for the web page 405 was loaded from a separate file or as part of the web page 405. If the user selects Network tab 430, the user may view a log of network activity relating to the rendering or display of the web page 405, for example.

If the user has selected the Elements tab 415, rendered HTML for the web page 405 may be displayed. The rendered HTML may be distinct from source code for the web page 405. For example, if any HTML elements are created or altered via JavaScript™ as the web page loads, those changes may be reflected within the rendered HTML, whereas the source code for the web page 405 may instead show the code without any alterations.

Information presented within the Elements tab 415 may include various attributes for HTML elements of the web page 405. An "attribute" or an "HTML attribute," as used herein, refers to a piece of markup language used to adjust the behavior or display of an HTML element. For example, attributes may be used to change the color, size, or functionality of HTML elements. Attributes may be used by including them in an opening HTML tag, such as: <tag-_name attribute_name="value">Content</tag_name>. An attribute may include the attribute name followed by an equals sign (=) and a value wrapped in quotes.

In accordance with an embodiment, for an "input" HTML element, "@placeholder" may be considered to be a more important attribute to determine a location candidate for the HTML element than "@id," which may be considered more important than "@text" and "@value," each of which may be considered to be more important than other attributes. For a "button" or "li" HTML element, "@id" may be considered to be a more important attribute to determine a location candidate for the HTML element than "string ( )" which may, in turn, be considered to be more important than other attributes. For an "a" HTML element, "@href" may be considered to be a more important attribute to determine a location candidate for the HTML element than "string( )" which may, in turn, be considered to be more important than other attributes. For certain read-only HTML elements such as "div," "string( )" may be considered to be a more important attribute to determine a location candidate for the HTML element than "@id," which may itself be considered to be more important than "@title," which may, in turn, be considered to be more important than other attributes.

The HTML elements may have certain characteristics. A "characteristic" of an HTML element or an "HTML characteristic," as used herein, refers to a piece of HTML code which describes an HTML element. A characteristic of an HTML element may include one or more attributes, inner text for the HTML element, and/or a label for the HTML element. "Inner text," as used herein, refers to rendered text content of a node and its descendants. For example, the inner text may refer to string patterns which an HTML tag manifests on a web page, such as with the syntax: css=<HTML tag><:><contains><("inner text")>

Figure 5:
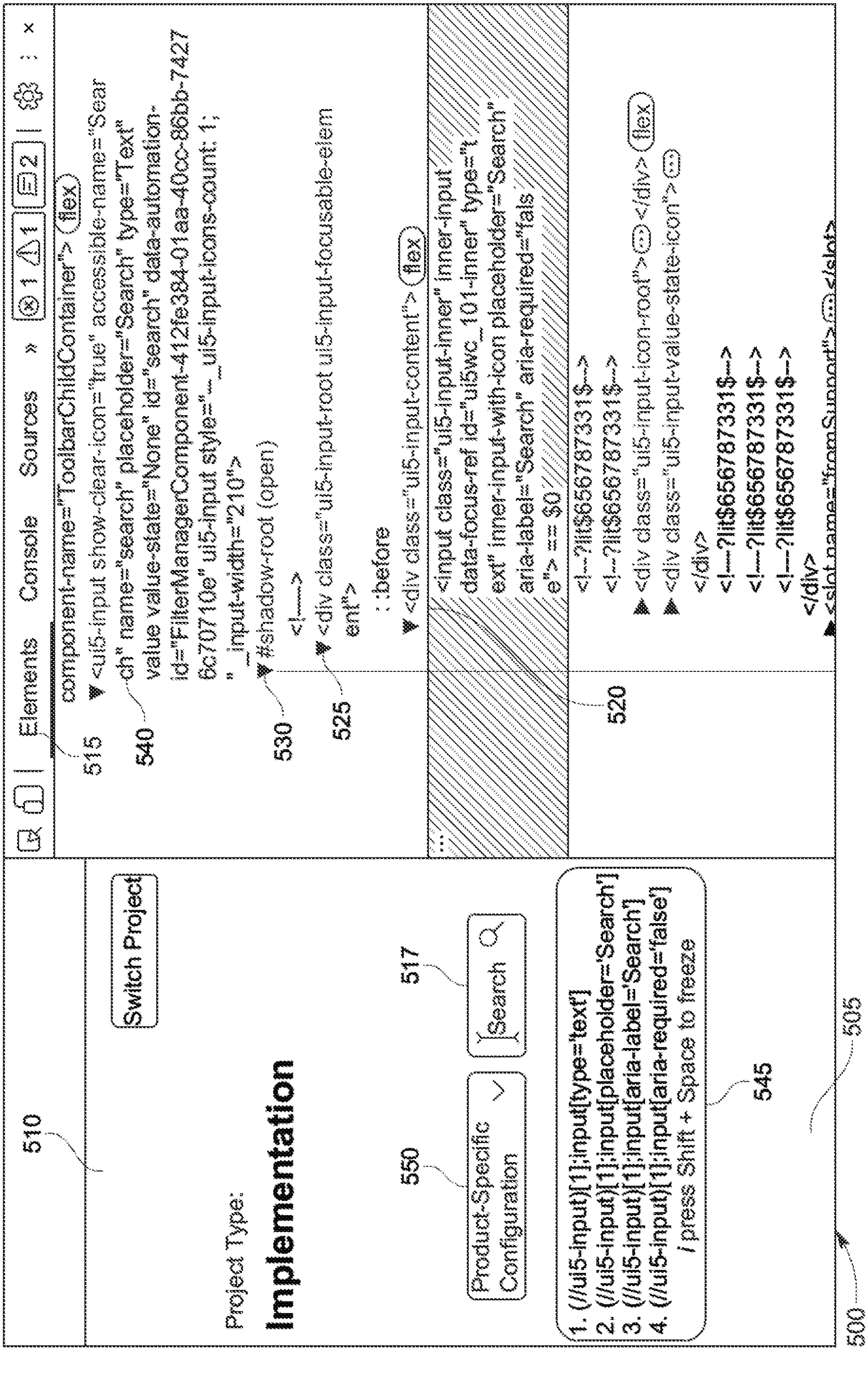
FIG. 5 illustrates a screenshot of a web page according to an embodiment.

FIG. 5 illustrates a screenshot 500 of a web page 505 according to an embodiment. Web page 505 includes text or information presented thereon in a main portion 510 of the web page. Web page 505 may include an Elements tab 515. If a user selects the Elements tab 515, various attributes may be displayed for HTML elements of the web page 505. If a user selects a search bar HTML element 517, information corresponding to the search bar HTML element 517 may be displayed in Elements tab 515. For example, a node 520 may be represented by HTML tag, <div class="u15-input-content"><input class="ui15-input-inner" inner-input data-focus-ref id="ui15wc_101-inner" type="text" inner-input-with-icon placeholders="Search" aria-label="Search" aria-required="false">. "Div class" is the parent node of the "input class". Both the "div class" and the "input class" nodes belong to the same shadow root, "ui5-input name='search'". Node 520 has a parent node 525, as indicated by the indentation of the tag for node 520 relative to parent node 525. In this example, parent node 525 has tag, <div class="u15-input-toot u15-input-focusable-element">. A shadow root 530 is the root node of a DOM subtree that is rendered separately from a document's main DOM tree. Shadow root 530 has a shadow host 540. In this example, shadow host 540 has tag <u15-inout show-clear-icon="true" accessible-name="Search" name="search" placeholder="Search" type="Text" value value-state="None" id="search" data-automation-id="FilterManagerComponent-412fe384-01aa-40cc-86bb-74276c70710e" u15-inputstyle="--_u15-input-icons-count: 1; "_input-width'" 210">.

Shadow DOM serves for encapsulation. It allows a component to have its very own "shadow" DOM tree which cannot be accidentally accessed from the main document, may have local style rules, and more. Shadow DOM refers to the ability of a web browser to include a subtree of DOM elements into the rendering of a web page or document, but not into the main document DOM tree. A shadow DOM tree is its own isolated DOM tree with its own elements and styles, completely isolated from the original DOM.

In FIG. 5, an output locator, such as an HTML location display window 545, may be displayed which includes a list of location candidates ranked in order from first to fourth, with the first location candidate being the most likely one. The four location candidates shown in HTML location display window 545 may be determined based on attributes shown for node 520. In this example, the first location candidate is (//ui5-input)[1];input[type="text"]. The first location candidate may be determined based on the first attribute listed at node 520. In accordance with an embodiment, a listed attribute determined to be the most important attribute for the HTML element at a node may be considered the main attribute for the HTML element. The second-fourth location candidates may be determined from other attributes for node 520, as shown in FIG. 5. For example, the second location candidate of HTML display window 545 is (//ui5-input)[1];input[Placeholder="Search"]. The third location candidate of HTML display window 545 is (//ui5-input)[1]; input[aria-label="Search"]. The fourth location candidate of HTML display window 545 is (//ui5-input)[1];input[aria-required="false"]. Each of the four candidate locations shown in HTML display window 545 show the name of the host, "(//ui5-input) [1]" as well as a CSS selector determination of the location based on the attributes or characteristics of the HTML element corresponding to node 520.

In FIG. 5, selection box HTML element 550 includes a drop-down menu with a heading, "Product-Specific Configuration." A tag for selection box HTML element 550 may include "Product-Specific Configuration" as an inner text.

Figure 6A:
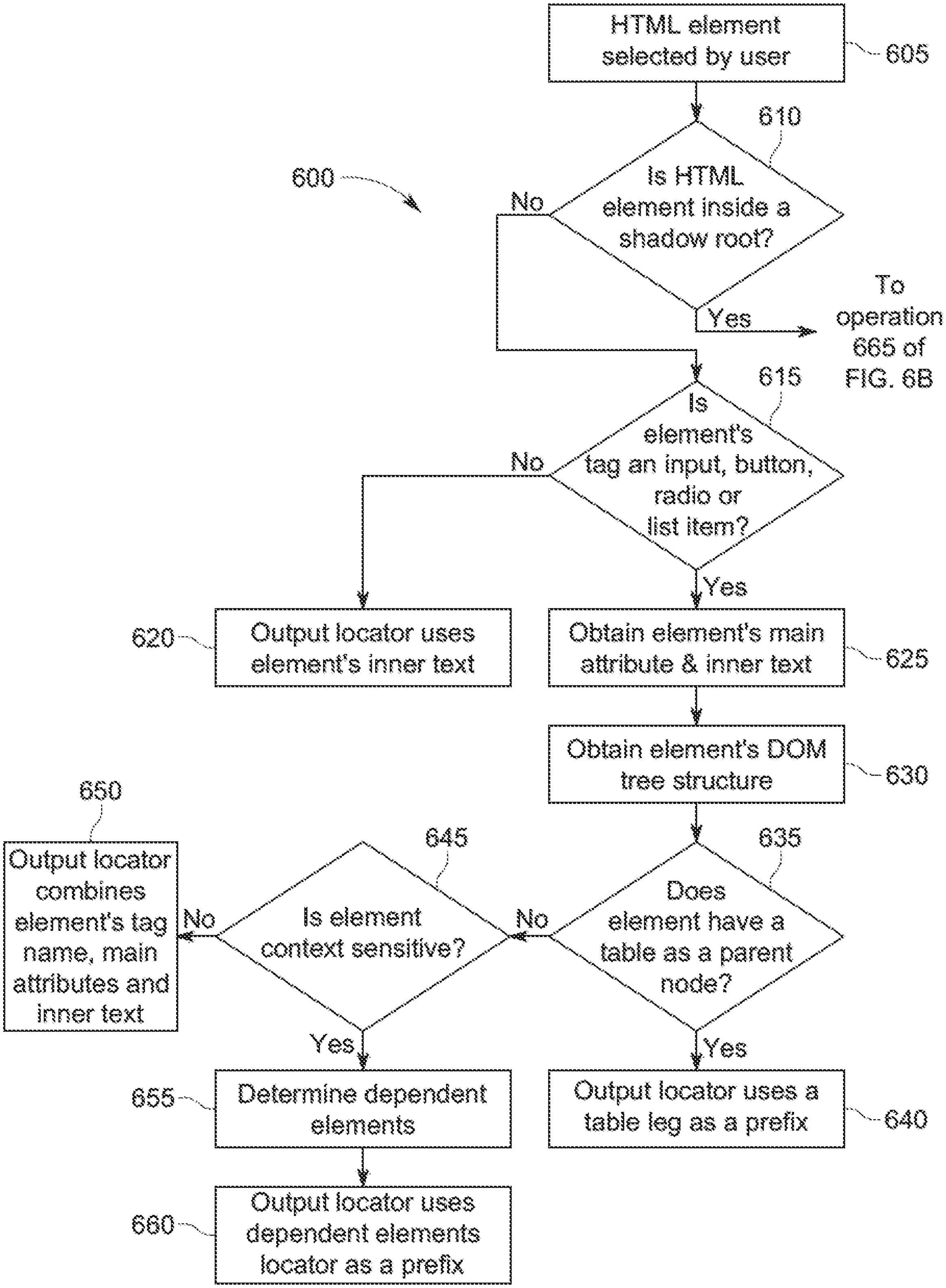
FIGS. 6A-6B illustrate an embodiment of a flowchart of a process for automatically determining a location candidate for a selected HTML element
Figure 6B:
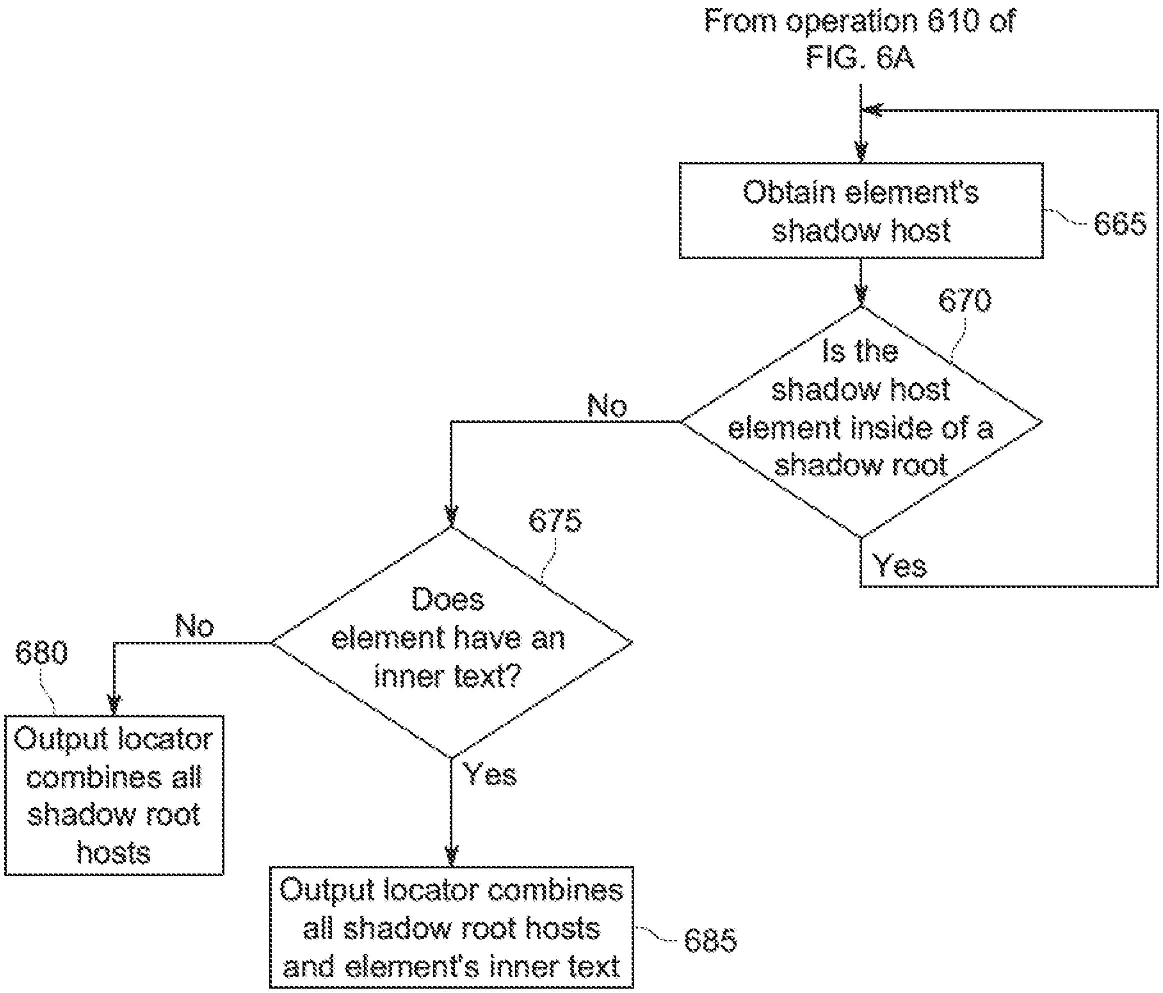

FIGS. 6A-6B illustrate an embodiment of a flowchart 600 of a process for automatically determining a location candidate for a selected HTML element An embodiment in accordance with flowchart 600 may determine location candidates for HTML elements located with within a shadow DOM, something which cannot be done in accordance with current systems. Embodiments in accordance with claimed subject matter may include all of, less than, or more than blocks 605 through 685. Also, the order of blocks 605 through 685 is merely an example order. For example, a method in accordance with an embodiment may be performed by a computing device having one or more processors.

At operation 605 of FIG. 6A, an HTML element may be selected by a user. For example, as discussed above, a user may move a cursor across a web page and may hover over an HTML element in order to select the HTML for which a location is desired to be determined. Alternatively, a user may select an HTML element via a different type of I/O device capable of receiving a user input, for example. At operation 610, a determination is made as to whether the selected HTML element is inside of a shadow root. Referring back to FIG. 5, an example of a shadow host 540 is depicted, for example. If "yes" at operation 610, processing proceeds to operation 665 of FIG. 6B. If "no" at operation 610, processing proceeds to operation 615 where a determination is made as to whether the HTML element comprises an input, button, radio, or list item. A radio button is one type of selection indicator in a list of options. Radio buttons allow a user to select one option from a set.

If "no" at operation 615, processing proceeds to operation 620, at which point an HTML locator uses the HTML elements inner text to determine one or more location candidates to be presented to a user in a display window. An example of inner text for an HTML element relates to a drop-down menu which includes the names of different options or a pre-filled text box which includes a particular text entry, for example. If "yes" at operation 615, the HTML elements' main attribute and inner text are obtained at operation 625.

At operation 620, the HTML element's DOM tree structure may be obtained. At operation 635, a determination may be made as to whether the HTML element has a table tag as a parent node. An HTML table consists of one <table> element and one or more <tr>, <th>, and <td> elements. The <tr> element defines a table row, the <th> element defines a table header, and the <td> element defines a table cell. If "yes" at operation 635, then the output locator may use a table leg as a prefix at operation 640. A prefix by itself may be considered a location candidate for the HTML element. A sample XPath is//tr//input[@placeholder='search']. If the table has multiple legs, all of the table legs may be scanned or processed to determine which table leg fulfills the conditions. In the example discussed above, the table legs may be scanned or processed to determine which table leg which has the element "input[@placeholder='search']".

If "no" at operation 635, a determination is made at operation 645 as to whether the HTML element is context sensitive. If "no" at operation 645, the output locator may combine the HTML element's tag name, main attribute, and inner text to determine a location candidate for the HTML element at operation 650. If "yes" at operation 645, dependent elements of the HTML element may be determined at operation 655. Next, at operation 660, the output locator may use the dependent element's locator as a prefix for a location candidate for the HTML element.

Referring to operation 665 of FIG. 6B, the HTML element's shadow host may be determined. At operation 670, a determination may be made as to whether the shadow host element is inside of a shadow root. If "yes," processing returns to operation 665. If "no" at operation 670, processing proceeds to operation 675 whether a determination is made as to whether the HTML element has inner text. If "no" at operation 675, the output locator may combine all of the shadow root hosts at operation 680 to determine location candidates for the HTML element. If "yes" at operation 685, the output locator may combine all shadow root hosts and the HTML element's inner text to determine location candidates for the HTML element.

A process in accordance with flowchart 600 may provide numerous advantages, such as providing a user with more time, more accuracy, and less training in determining a location for an HTML element. For example, the process makes it relatively easy to determine one or more location candidates for an HTML element with a reduced amount of manual effort in order to determine the location candidates. The process performs sorting among location candidates with a relatively high level of accuracy. There are no operating system limitations on the use of the process. Similarly, there may be no limitations on web user interface (UI) technologies, and the process may handle complex web pages such as web pages using shadow DOM The process does not require a user to have a technological background relating to XPath technology. Instead, the user may select the first location candidate which is automatically determined upon the user selecting an HTML element to locate. The accuracy of the process may also be continuously improved, such as via the use of machine learning, for example.

Figure 7:
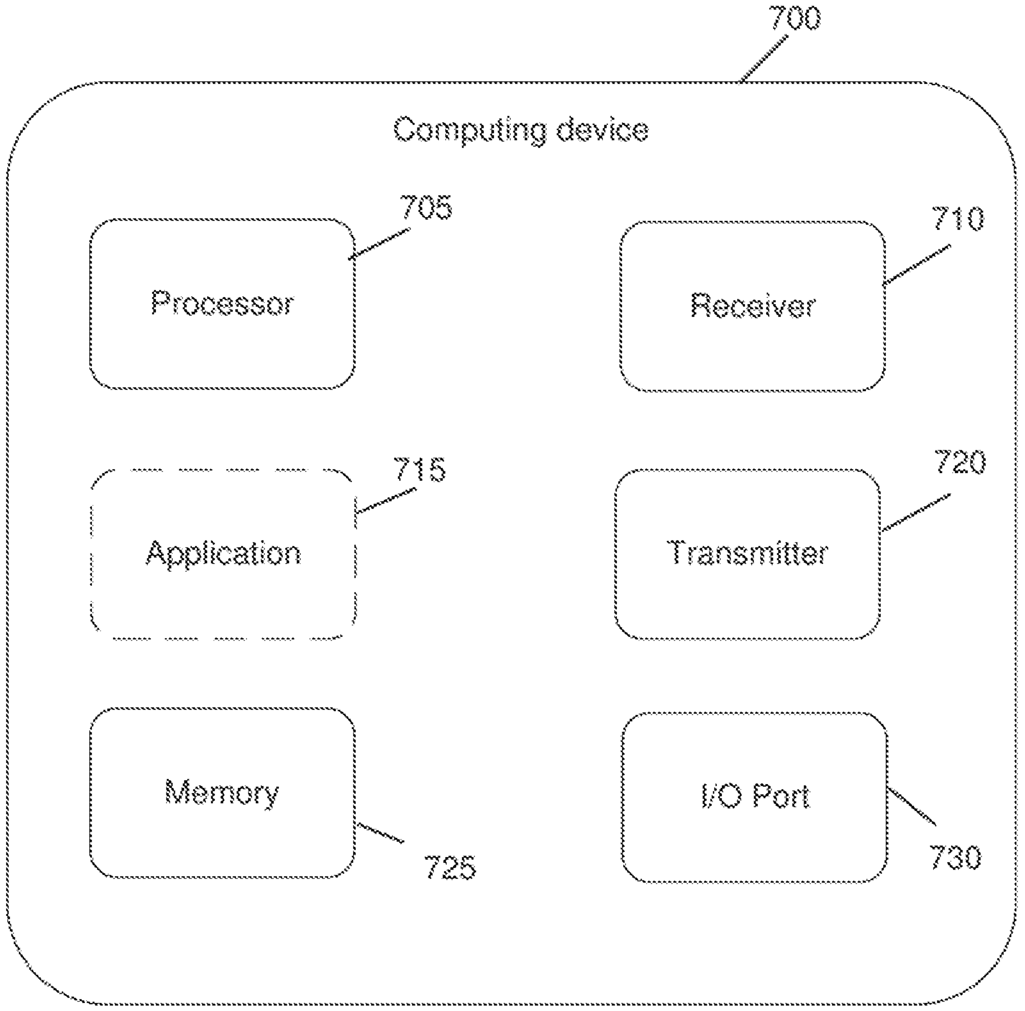
FIG. 7 illustrates a computing device according to an embodiment.

FIG. 7 illustrates a computing device 700 according to an embodiment. Computing device 700 may include a processor 705. Processor 705 may be utilized to execute an application 710, such as a web browser and/or a web browser extension or other separate application program to determine location candidates for an HTML element. Computing device 700 may include additional components, such as a memory 715, a receiver 720, a transmitter 725, and an Input/Output (I/O) port 730. Processor 705 may execute computer-executable code stored in memory 715 which may be related to application 710. Application 710 of computing device 700 may communicate with an application of a server, for example. For example, computing device 700 may communicate via receiver 720, transmitter 725, and/or I/O port 730.

Some portions of the detailed description are presented herein in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing." "computing," "calculating." "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

It should be understood that for ease of description, a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), a storage area network (SAN), and/or other forms of computing and/or device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as computing and/or communication protocols (e.g., network protocols), may interoperate within a larger network. In this context, the term sub-network and/or similar terms, if used, for example, with respect to a network, refers to the network and/or a part thereof. Sub-networks may also comprise links, such as physical links, connecting and/or coupling nodes, such as to be capable to transmit signal packets and/or frames between devices of particular nodes, including wired links, wireless links, or combinations thereof. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices of a node, but without the communicating devices necessarily specifying one or more intermediate devices of one or more nodes and/or may include communicating as if intermediate devices of intermediate nodes are not necessarily involved in communication transmissions. For example, a router may provide a link and/or connection between otherwise separate and/or independent LANs. In this context, a private network refers to a particular, limited set of network devices able to communicate with other network devices in the particular, limited set, such as via signal packet and/or frame transmissions, for example, without a need for re-routing and/or redirecting transmissions. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame transmissions may employ intermediate devices of intermediate nodes to exchange signal packet and/or frame transmissions, those intermediate devices may not necessarily be included in the private network by not being a source or destination for one or more signal packet and/or frame transmissions, for example. It is understood in this context that a private network may provide outgoing network communications to devices not in the private network, but devices outside the private network may not necessarily be able to direct inbound network communications to devices included in the private network.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A method, comprising:

receiving a user selection of a HyperText Markup Language (HTML) element on a web page;

automatically acquiring a source representation of objects which comprise a structure and content of the web page;

automatically processing the source representation to determine an ordered list of two or more candidate locations for the HTML element, wherein the automatically processing the source representation includes determining whether the HTML element has a tag comprising an input, button, or radio;

in response to determining that the HTML element does not have a tag comprising an input, button, or radio, generating an output locator comprising the HTML element's inner text;

in response to determining that the HTML element has a tag comprising an input, button, or radio, determining whether the HTML element has a table as a parent node, and in response to determining that the HTML element has a table as a parent node, generating the output locator comprising a table tag as a prefix, the output locator presenting the ordered list of two or more location candidates for the HTML element, or in response to determining that the HTML element does not have a table as a parent node, generating the output locator by combining the HTML elements' tag name, main attributes, and inner text if the HTML element is not context sensitive, or generating the output locator with the HTML element's dependent elements as the prefix if the HTML element is context sensitive; and displaying the output locator.

2. The method of claim 1, wherein the automatically processing of the source representation to determine the ordered list of candidate locations further comprises:

automatically determining whether the HTML element is inside of a shadow root of a Document Object Model (DOM) tree for the web page.

3. The method of claim 1, wherein the user selection of the HTML element on the web page is determined based on a user hovering a cursor over the HTML element.

4. The method of claim 1, wherein functionality of the HTML element is capable of being automated.

5. The method of claim 1, wherein the web page comprises a dynamic web page.

6. The method of claim 1, further comprising determining whether the HTML element is context sensitive.

7. An article, comprising:

a non-transitory storage medium comprising machine-readable instructions executable by a processor to perform:

processing a received user selection of a HyperText Markup Language (HTML) element on a web page;

automatically determining whether the HTML element is inside of a shadow root of a Document Object Model (DOM) tree for the web page;

in response to automatically determining that the HTML element is not inside of a shadow host, determining whether the HTML element has a tag comprising an input, button, or radio;

in response to automatically determining that the HTML element does not have a tag comprising an input, button, or radio, generating the output locator comprising the HTML element's inner text, in response to automatically determining that the HTML element has a tag comprising an input, button, or radio, determining whether the HTML element has a table as a parent node;

in response to determining that the HTML element has a table as a parent node, generating the output locator comprising a table tag as a prefix, in response to determining that the HTML element does not have a table as a parent node, generating the output locator by combining the HTML elements' tag name, main attributes, and inner text if the HTML element is not context sensitive, or generating the output locator with the HTML element's dependent elements as the prefix if the HTML element is context sensitive; and responsive to generating the output locator, displaying an ordered list of candidate locations for the HTML element.

8. The article of claim 7, wherein the machine-readable instructions are further executable by the processor to perform:

in response to automatically determining that the HTML element is inside of a shadow root of a DOM tree, obtaining one of more shadow hosts of the HTML element and responsive to automatically determining that the HTML element has an inner text, performing the generating of the output locator by combining the one or more shadow hosts with the HTML element's inner text, and responsive to automatically determining that the HTML element lacks an inner text, performing the generating of the output locator by including the one or more shadow hosts.

9. The article of claim 7, wherein the machine-readable instructions are further executable by the processor to determine the user selection of the HTML element on the web page in response to the user hovering a cursor over the HTML element.

10. The article of claim 7, wherein functionality of the HTML element is capable of being automated.

11. A system comprising:

at least one programmable processor;

a receiver to receive a user selection of a HyperText Markup Language (HTML) element on a web page; and a non-transitory machine-readable medium storing instructions that, when executed by the at least one programmable processor, cause the at least one programmable processor to perform operations comprising:

automatically acquiring a source representation of the objects that comprise the structure and content of the web page;

automatically processing the source representation to determine an ordered list of two or more location candidates indicating respective candidate locations for the HTML element, wherein the automatically processing the source representation includes determining whether the HTML element has a tag comprising an input, button, or radio;

in response to determining that the HTML element does not have a tag comprising an input, button, or radio, generating an output locator comprising the HTML element's inner text;

in response to determining that the HTML element has a tag comprising an input, button, or radio, determining whether the HTML element has a table as a parent node, and in response to determining that the HTML element has a table as a parent node, generating the output locator comprising a table tag as a prefix, the output locator presenting the ordered list of two or more location candidates for the HTML element, or in response to determining that the HTML element does not have a table as a parent node, generating the output locator by combining the HTML elements' tag name, main attributes, and inner text if the HTML element is not context sensitive, or generating the output locator with the HTML element's dependent elements as the prefix if the HTML element is context sensitive; and displaying the output locator.

12. The system of claim 11, wherein the instructions are further executable by the at least one programmable processor to perform at least one additional operation comprising automatically determining whether the HTML element is inside of a shadow root of a Document Object Model (DOM) tree for the web page.

13. The system of claim 11, wherein the instructions are further executable by the at least one programmable processor to perform at least one additional operation comprising the determining whether the HTML element has a tag comprising an input, button, or radio in response to automatically determining that the HTML element is not inside of a shadow host.

14. The system of claim 11, wherein the user selection of the HTML element on the web page is determined based on a user hovering a cursor over the HTML element.

15. The system of claim 11, wherein functionality of the HTML element is capable of being automated.

16. The system of claim 11, wherein the instructions are further executable by the at least one programmable processor to perform at least one additional operation comprising determining whether the HTML element is context sensitive.

* * * * *